US012651116B2

(12) United States Patent
Choi et al.

(10) Patent No.: US 12,651,116 B2
(45) Date of Patent: Jun. 9, 2026

(54) SELECTIVE PARAMETER-EFFICIENT FINE-TUNING FOR LARGE-SCALE MODELS

(71) Applicant: QUALCOMM Incorporated, San Diego, CA (US)

(72) Inventors: Sungha Choi, Goyang-si (KR); Jungsoo Lee, Paju (KR); Jaeseong You, Seoul (KR); Debasmit Das, San Diego, CA (US); Munawar Hayat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 18/424,613

(22) Filed: Jan. 26, 2024

(65) Prior Publication Data

US 2025/0245427 A1 Jul. 31, 2025

(51) Int. Cl.
*G06F 40/20* (2020.01)

(52) U.S. Cl.
CPC .................................... *G06F 40/20* (2020.01)

(58) Field of Classification Search
CPC ......... G06F 40/20; G06N 3/096; G06N 3/045
See application file for complete search history.

(56) References Cited

U.S. PATENT DOCUMENTS

2025/0278417 A1* 9/2025 Mui ........................ G06F 40/30

FOREIGN PATENT DOCUMENTS

| WO | WO-2025064373 A1 * | 3/2025 | ........... G10L 15/005 |
|----|----|----|----|
| WO | WO-2025095958 A1 * | 5/2025 | ............. G06N 3/084 |
| WO | WO-2025128894 A1 * | 6/2025 | ............. G06F 40/20 |
| WO | WO-2025151181 A1 * | 7/2025 | ............. G06N 3/084 |

OTHER PUBLICATIONS

Chavan A., et al., "One-For-All: Generalized Lora for Parameter-Efficient Fine-Tuning", arXiv:2306.07967v2 [cs.LG], Oct. 16, 2023, 16 Pages.
Chen S., et al., "AdaptFormer: Adapting Vision Transformers for Scalable Visual Recognition", 36th Conference on Neural Information Processing Systems (NeurIPS), 2022, pp. 1-15.
He H., et al., "Sensitivity-Aware Visual Parameter-Efficient Fine-Tuning", arXiv:2303.08566v2 [cs.CV], Aug. 31, 2023, 17 Pages.
Hu E., et al., "LoRA: Low-Rank Adaptation of Large Language Models", International Conference on Learning Representations, arXiv:2106.09685v2 [cs.CL], Oct. 16, 2021, pp. 1-26.
Jia M., et al., "Visual Prompt Tuning", arXiv:2203.12119v2 [ cs.CV], Jul. 20, 2022, pp. 1-35.

(Continued)

*Primary Examiner* — Mohammad K Islam
(74) *Attorney, Agent, or Firm* — Seyfarth Shaw LLP

(57) ABSTRACT

A processor-implemented method for selective parameter efficient fine-tuning (PEFT) includes receiving a large language model (LLM). The LLM has multiple layers with each layer having a set of parameters. A subset of the parameters are identified to fine-tune for a downstream task based on a score function. An adapter is applied to the identified subset of the parameters to fine-tune. Only the identified subset of the parameters is fine-tuned.

14 Claims, 11 Drawing Sheets

(56)          References Cited

OTHER PUBLICATIONS

Jie S., et al., "Convolutional Bypasses are Better Vision Transformer Adapters", arXiv:2207.07039v3 [cs.CV], Aug. 9, 2022, 11 Pages.

Jie S., et al., "FacT: Factor-Tuning for Lightweight Adaptation on Vision Transformer", arXiv:2212.03145v2 [cs.CV], Jun. 10, 2023, 11 Pages.

Jie S., et al., "Revisiting the Parameter Efficiency of Adapters from the Perspective of Precision Redundancy", arXiv:2307.16867v1 [cs.CV] Jul. 31, 2023, 14 Pages.

Luo G., et al., "Towards Efficient Visual Adaption via Structural Re-parameterization", arXiv:2302.08106v2 [cs.CV], Mar. 21, 2023, 10 Pages.

Yin D., et al., "1% VS 100%: Parameter-Efficient Low Rank Adapter for Dense Predictions", IEEE/CVF Conference on Computer Vision and Pattern Recognition (CVPR), 2023, 11 pages.

Yin D., et al., "Parameter-Efficient is not Sufficient: Exploring Parameter, Memory, and Time Efficient Adapter Tuning for Dense Predictions", arXiv:2306.09729v1 [cs.CV], Jun. 16, 2023, pp. 1-14.

Zhang Y., et al., "Neural Prompt Search", arXiv:2206.04673v2 [cs.CV], Jun. 14, 2022, pp. 1-13.

Gui A., et al., "HiFi: High-Information Attention Heads Hold for Parameter-Efficient Model Adaptation", arXiv:2305.04573v1 [cs.CL], May 8, 2023, 15 Pages.

International Search Report and Written Opinion—PCT/US2024/058288—ISA/EPO—Apr. 1, 2025.

Ma X., et al., "LLM-Pruner: On the Structural Pruning of Large Language Models", arXiv:2305.11627v3 [cs.CL], Sep. 28, 2023, 20 Pages.

Xu L., et al., "Parameter-Efficient Fine-Tuning Methods for Pretrained Language Models: A Critical Review and Assessment", arXiv:2312.12148v1 [cs.CL], Dec. 19, 2023, 20 Pages.

Zhang F., et al., "IncreLoRA: Incremental Parameter Allocation Method for Parameter-Efficient Fine-tuning", arXiv:2308.12043v1 [cs.CL], Aug. 23, 2023, 12 Pages.

Zhang M., et al., "LoRAPrune: Pruning Meets Low-Rank Parameter-Efficient Fine-Tuning", arXiv:2305.18403v3 [cs.LG], Oct. 3, 2023, 17 Pages.

* cited by examiner

202

FULLY CONNECTED

204

LOCALLY CONNECTED

210

212

214

216

206

CONVOLUTIONAL

208

500

Selective PEFT

Projection-wise

Head-wise

900

RECEIVE A LARGE LANGUAGE MODEL (LLM), THE LLM HAVING MULTIPLE LAYERS, EACH LAYER HAVING A SET OF PARAMETERS ⟋ 902

IDENTIFY A SUBSET OF THE PARAMETERS TO FINE-TUNE FOR A DOWNSTREAM TASK BASED ON A SCORE FUNCTION ⟋ 904

APPLY AN ADAPTER TO THE IDENTIFIED SUBSET OF THE PARAMETERS TO FINE-TUNE ⟋ 906

FINE-TUNE ONLY THE IDENTIFIED SUBSET OF THE PARAMETERS ⟋ 908

SELECTIVE PARAMETER-EFFICIENT FINE-TUNING FOR LARGE-SCALE MODELS

FIELD OF THE DISCLOSURE

Aspects of the present disclosure generally relate to selective parameter-efficient fine-tuning for large-scale models.

BACKGROUND

Artificial neural networks may comprise interconnected groups of artificial neurons (e.g., neuron models). The artificial neural network (ANN) may be a computational device or be represented as a method to be performed by a computational device. Convolutional neural networks (CNNs) are a type of feed-forward ANN. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Large-scale models such as large language models (LLMs), large vision models (LVMs), or their combinations have grown in popularity because of their ability to recognize, summarize, translate, predict and generate content. LLMs and LVMs are deep learning models including transformer networks that may learn context and meaning by tracking relationships in sequential input data such as words in a sentence or images in a video.

Given the many useful applications of large-scale models, there is also increasing demand for use thereof on edge devices, such as smartphones. However, large-scale models have use very large data sets with hundreds of billions of examples to train several hundred billion parameters. As a result, training such large-scale models may be time consuming and expensive.

Recently, the use of task-specific adapters in large artificial intelligence (AI) models such as large language models (LLMs) has increased for specific downstream task adaptation. The adapters may vary greatly for the different tasks and may yield effective responses without changes to large AI models. Many of these adapters may also be customized for individuals for an enhanced personal experience.

Some conventional approaches for personalization involve parameter-efficient fine-tuning (PEFT) methods to adapt large-scale models for downstream tasks. However, conventional PEFT methods, such as low-rank adaptation (LoRA) of LLMs, may change the entire set of model parameters despite adopting a low-rank approximation of parameter increments, which is time consuming and may be involve excessive computations. Thus, training and deployment on edge devices that may have limited computational resources may be challenging.

SUMMARY

In some aspects of the present disclosure, a processor-implemented method includes receiving a large language model (LLM). The LLM has multiple layers and each layer has a set of parameters. The processor-implemented method also includes identifying a subset of the parameters to fine-tune for a downstream task based on a score function.

The processor-implemented method additionally includes applying an adapter to the identified subset of the parameters to fine-tune. The processor-implemented method further includes fine-tuning only the identified subset of the parameters.

Various aspects of the present disclosure are directed to an apparatus including means for receiving a large language model (LLM). The LLM has multiple layers and each layer has a set of parameters. The apparatus also includes means for identifying a subset of the parameters to fine-tune for a downstream task based on a score function. The apparatus additionally includes means for applying an adapter to the identified subset of the parameters to fine-tune. The apparatus further includes means for fine-tuning only the identified subset of the parameters.

Various aspects of the present disclosure are directed to an apparatus having at least one memory and one or more processors coupled to the at least one memory. The processor(s) is configured to receive a large language model (LLM). The LLM has multiple layers and each layer has a set of parameters. The processor(s) is also configured to identify a subset of the parameters to fine-tune for a downstream task based on a score function. The processor(s) is additionally configured to apply an adapter to the identified subset of the parameters to fine-tune. The processor(s) is configured to fine-tune only the identified subset of the parameters.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
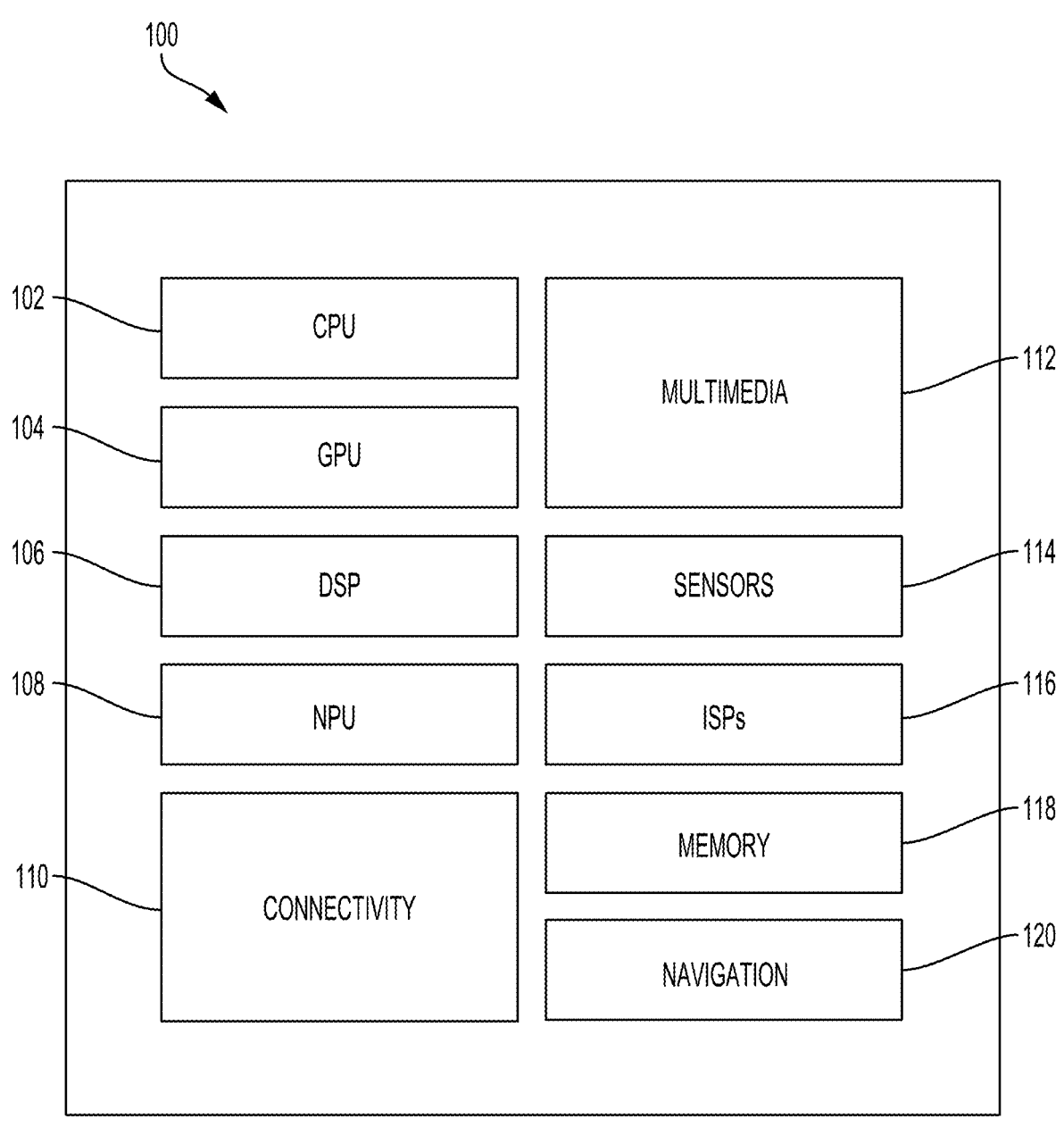
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In network pruning literature, global pruning approaches may be considered superior to layer-wise pruning approaches. Neural network pruning refers to a method of compression that involves removing weights from a trained model that may be redundant or may have less impact on the model accuracy. A weight may be pruned by setting the weight parameter to zero.

Similarly, conventional parameter efficient fine-tuning (PEFT), such as low-rank adaptation (LoRA) of LLMs, may be considered as a layer-wise approach that applies the same sparsity to all layers. LoRA proposes freezing pre-trained model weights and injecting trainable rank decomposition matrices into each layer of a transformer architecture, rather than retraining all model parameters, as is done in full fine-tuning approaches. Thus, conventional PEFT approaches may involve compressing increments of weights (AW) of the model instead of the pre-trained weights "Wo" themselves. However, conventional PEFT approaches involve fine-tuning the entire layer without considering the importance of each layer. Consequently, conventional PEFT approaches, such as LoRA, may change the entire set of model parameters, despite adopting a low-rank approximation of parameter increments.

Fine-tuning all of the parameters of a large-scale foundation model for each downstream task may be time consuming and expensive to train. Conventional PEFT approaches, such as LoRA methods, change all model parameters despite adopting a low-rank approximation of parameter increments. As such, when downstream tasks have a small dataset, updating the entire set of model parameters may lead to overfitting issues. Having a large number of trainable parameters may consume a large amount of memory to store individual network copies for each of multiple downstream tasks. That is, for each downstream task, an entire model may have to be stored. Additionally, a portion of the parameters may have to be retained to leverage the generalized knowledge of a well-trained large-scale model.

Accordingly, aspects of the present disclosure are directed to selective parameter efficient fine-tuning. Various aspects identify more important connections for each downstream task. In turn, one or more adapters may be attached and employed to only fine-tune the identified connections. Accordingly, while conventional approaches may change all projection matrices, aspects of the present disclosure may refrain from updating a portion of the projection matrices that do not satisfy a score function criterion.

Particular aspects of the subject matter described in this disclosure can be implemented to realize one or more of the following potential advantages. In some examples, the described techniques such as identifying subsets of parameters according to a score function and selectively fine-tuning the identified subset of parameters may beneficially increase model training efficiency and model performance (e.g., model accuracy) and may reduce memory consumption and costs.

Moreover, aspects of the present disclosure may apply for fine-tuning on edge devices. For example, aspects of the present disclosure may enable on-device personalization of large vision or language models including (but not limited to) personalization of generative artificial intelligence (AI) and perception models. Aspects of the present disclosure may also have application in extended reality (XR). For instance, aspects of the present disclosure may enable increased inference accuracy based on selective PEFT on-device.

Certain aspects and techniques as described herein may be implemented, at least in part, using an artificial intelligence (AI) program, such as a program that includes a machine learning (ML) or artificial neural network (ANN) model. An example ML model may include mathematical representations or define computing capabilities for making inferences from input data based on patterns or relationships identified in the input data. As used herein, the term "inferences" can include one or more of decisions, predictions, determinations, or values, which may represent outputs of the ML model. The computing capabilities may be defined in terms of certain parameters of the ML model, such as weights and biases. Weights may indicate relationships between certain input data and certain outputs of the ML model, and biases may represent offsets which may indicate a starting point for outputs of the ML model. An example ML model, operating on input data, may start at an initial output based on the biases and then update its output based on a combination of the input data and the weights.

ML models may be characterized in terms of types of learning that generate specific types of learned models that perform specific types of tasks. For example, different types of machine learning include supervised learning, unsupervised learning, semi-supervised learning, reinforcement learning, etc. ML models may be used to perform different tasks such as classification or regression, where classification refers to determining one or more discrete output values from a set of predefined output values, and regression refers to determining continuous values which are not bounded by predefined output values. Some example ML models configured for performing such tasks include ANNs such as convolutional neural networks (CNNs) and recurrent neural networks (RNNs), transformers, diffusion models, regression analysis models (such as statistical models), large language models (LLMs), decision tree learning (such as predictive models), support vector networks (SVMs), and probabilistic graphical models (such as a Bayesian network), etc.

FIG. 1 illustrates an example implementation of a system-on-a-chip (SOC) 100, which may include a central processing unit (CPU) 102 or a multi-core CPU configured for selective parameter efficient fine-tuning. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM, RISC-V (RISC-five), or any reduced instruction set computing (RISC) architecture. In aspects of the present disclosure, the instructions loaded into the general-purpose processor 102 may include code to receive a large language model (LLM), the LLM having multiple layers, each layer having a set of parameters. The instructions loaded into the general-purpose processor 102 may also include code identify a subset of the parameters to fine-tune for a downstream task based on a score function. The instructions loaded into the general-purpose processor 102 may additionally include code apply an adapter to the identified subset of the parameters to fine-tune. The instructions loaded into the general-purpose processor 102 may further include code fine-tune only the identified subset of the parameters.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
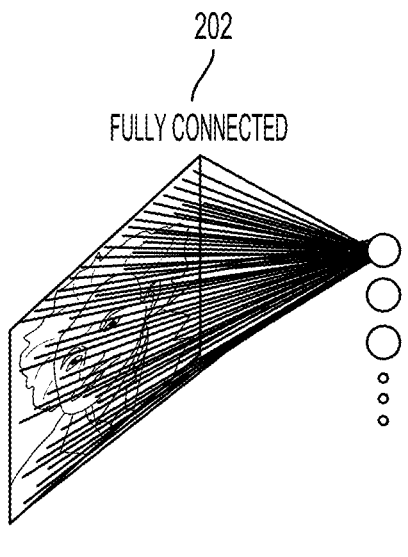
FIGS. 2A, 2B, and 2C are diagrams illustrating a neural network in accordance with aspects of the present disclosure.
Figure 2B:
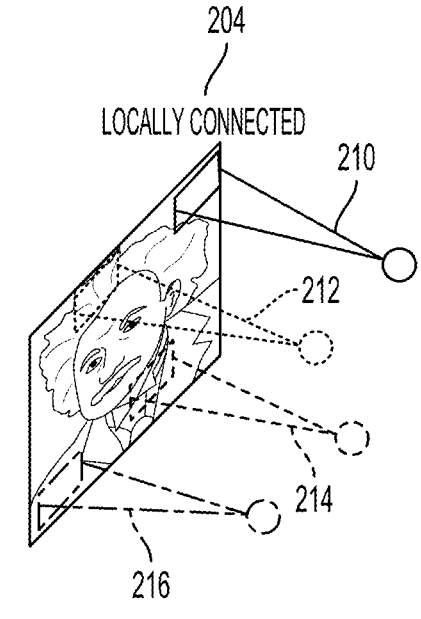

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
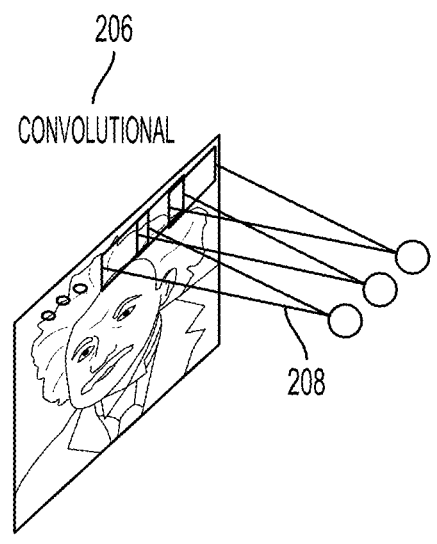

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
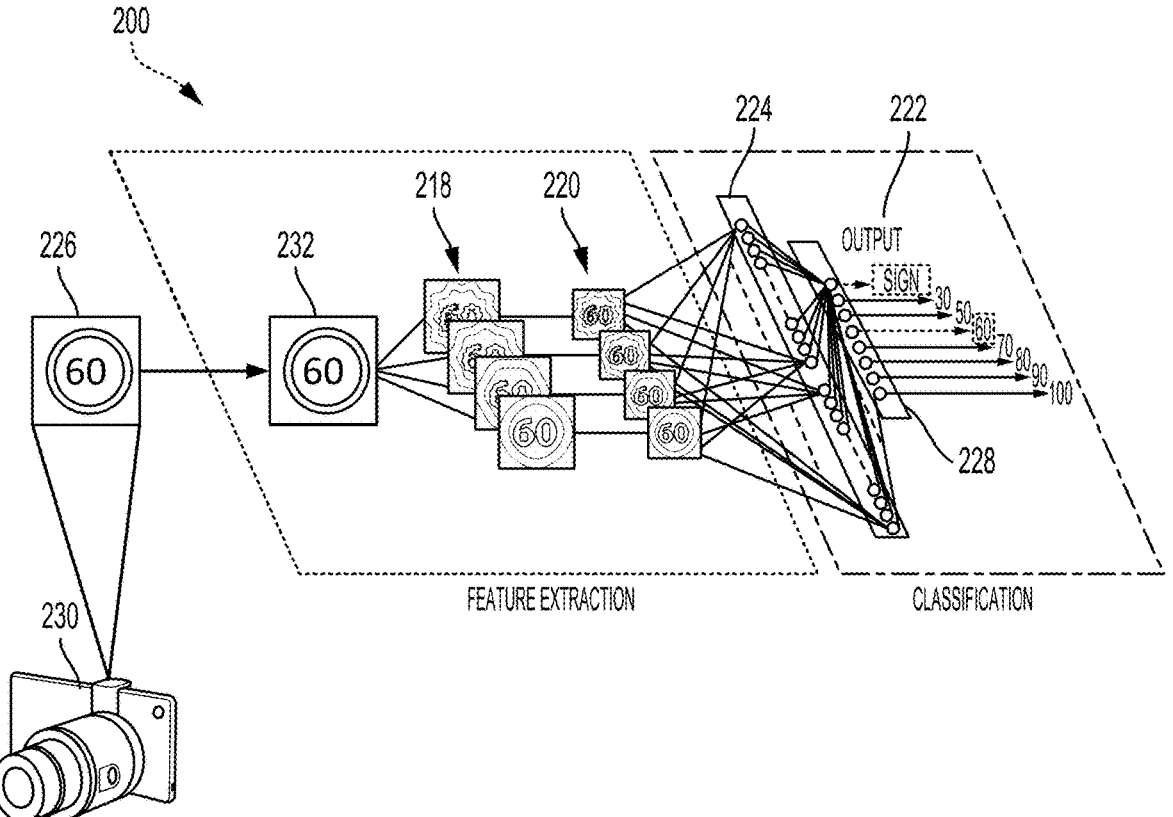
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a $5x5$ kernel that generates $28x28$ feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as $14x14$, is less than the size of the first set of feature maps 218, such as $28x28$. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network. For example, backpropagation techniques may be used to train an ANN by iteratively adjusting weights or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images (e.g., the speed limit sign of the image 226) and a forward pass through the DCN 200 may yield an output 222 that may be considered an inference or a prediction of the DCN 200.

An optimization algorithm may be used during a training process to adjust weights and biases as needed to reduce or minimize the loss function which should improve the performance of the model. There are a variety of optimization algorithms that may be used along with backpropagation techniques or other training techniques.

Some initial examples include a gradient descent based optimization algorithm and a stochastic gradient descent based optimization algorithm. A stochastic gradient descent technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model. A "dropout" technique may be used to randomly drop out some of the artificial neurons from a model during a training process, for example, in order to reduce overfitting and potentially improve the generalization of the model. An "early stopping" technique may be used to stop an on-going training process early, such as when a performance of the model using a validation dataset starts to degrade.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max (0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
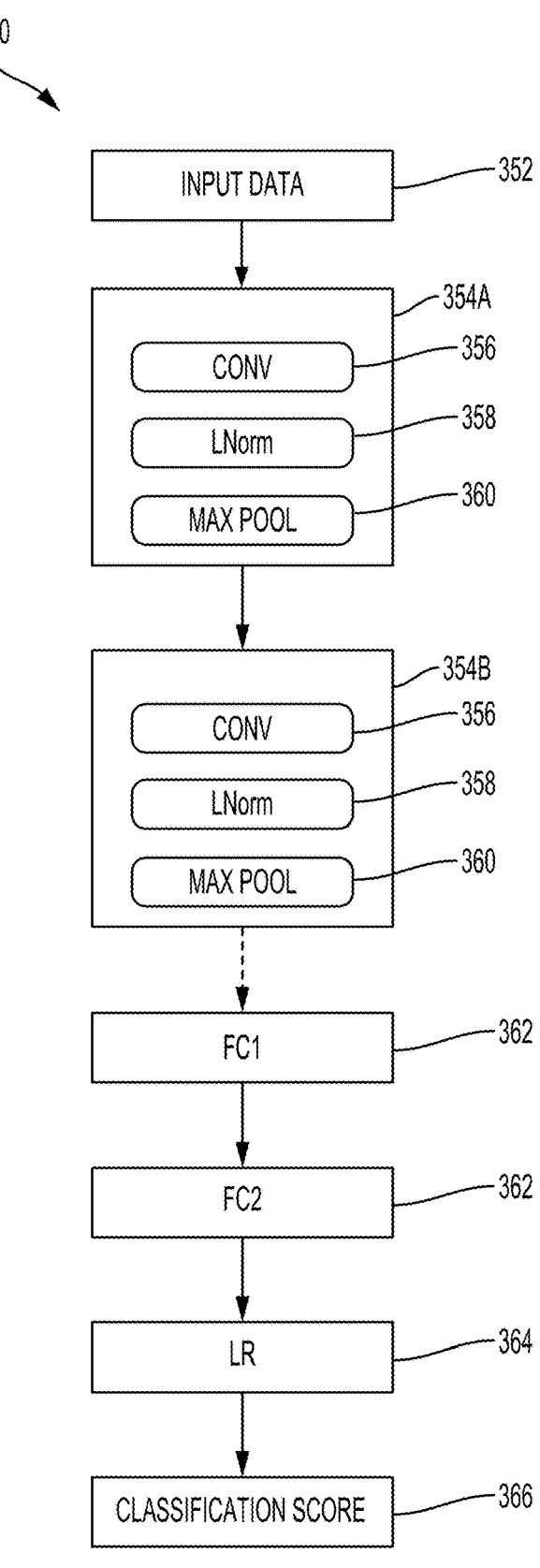
FIG. 3 is a block diagram illustrating an exemplary deep convolutional network (DCN) in accordance with aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
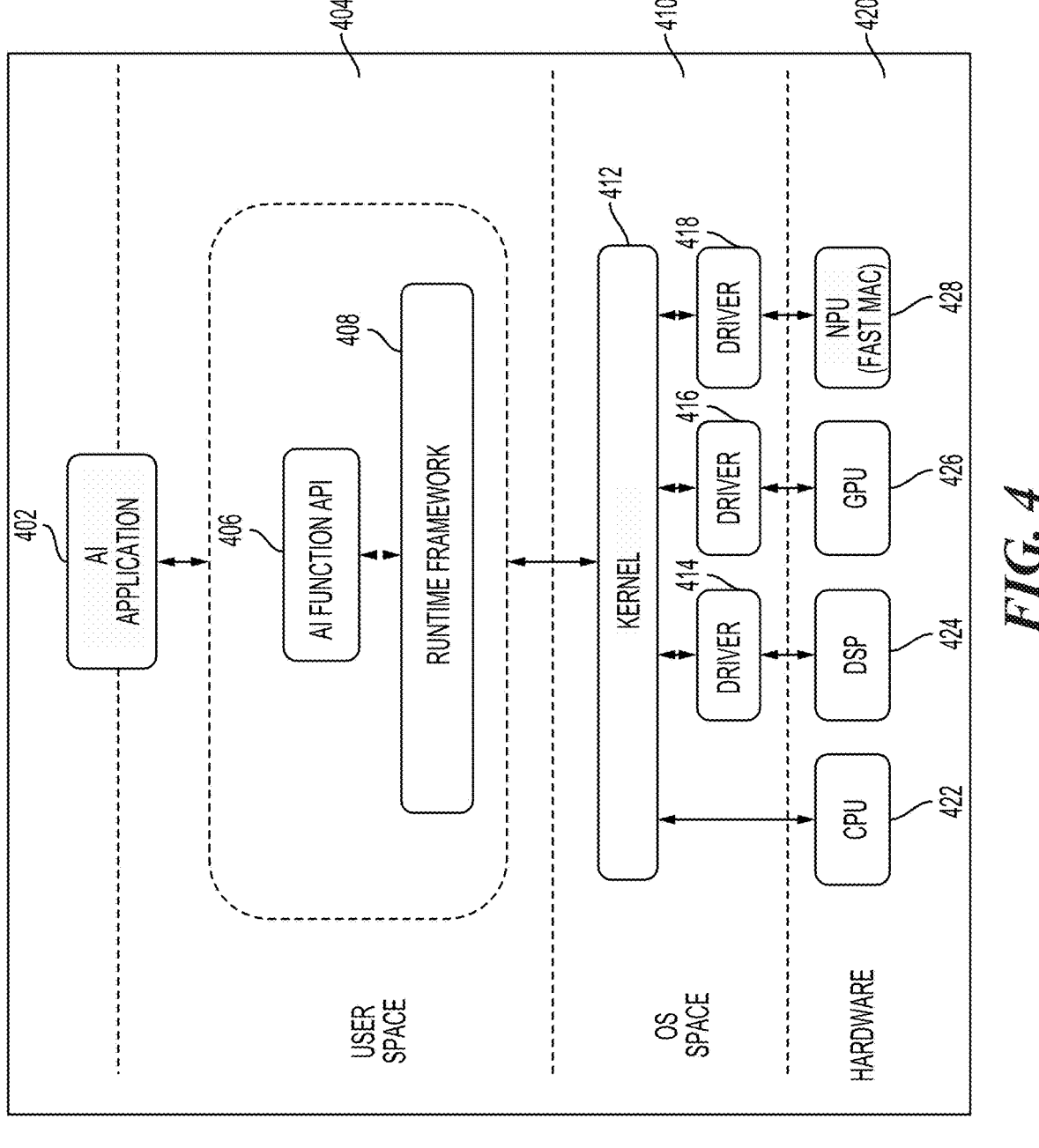
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SOC 100 of FIG. 1) to support selective parameter-efficient fine-tuning for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

The run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may cause a selective parameter efficient fine-tuning (PEFT) to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

As described, aspects of the present disclosure are directed to selective parameter efficient fine-tuning. In various aspects, more important connections may be identified for each downstream task. In turn, one or more adapters may be attached and employed to only fine-tune the identified connections. In turn, one or more adapters may be attached exclusively to the identified connections, allowing for fine-tuning.

Figure 5:
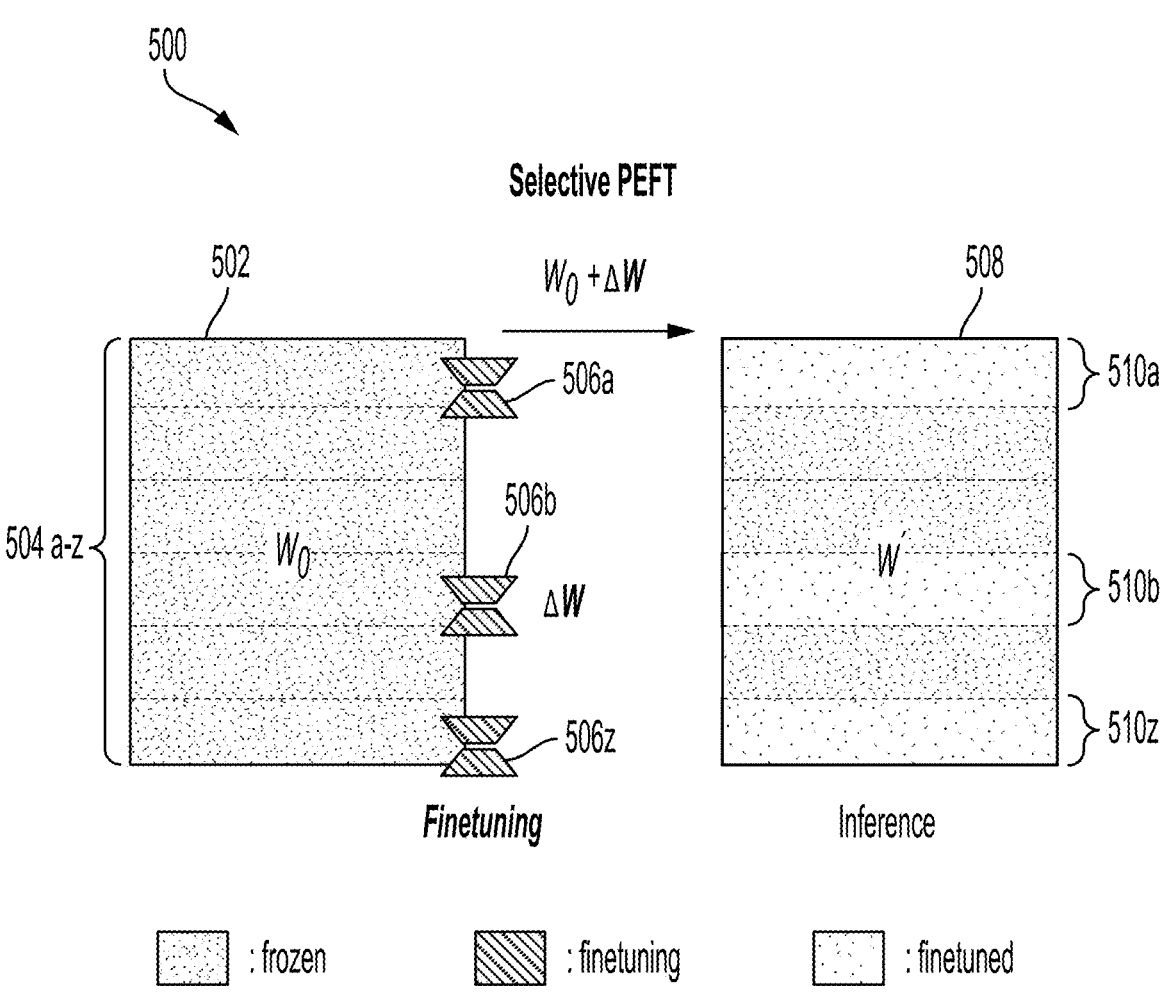
FIG. 5 is a block diagram illustrating an example implementation of selective parameter efficient fine-tuning (PEFT), in accordance with various aspects of the present disclosure.

FIG. 5 is a block diagram illustrating an example implementation 500 of selective parameter efficient fine-tuning, in accordance with various aspects of the present disclosure. Referring to FIG. 5, in the example implementation 500, a large language model (LLM) 502 may be configured for a visual reasoning task, a generative artificial intelligence task, an image processing task, or other tasks, for example. The LLM 502 may have a set of layers 504*a-z*. Each layer 504*a-z* of the LLM 502 may include a set of pre-trained parameters $W_0$.

The LLM 502 may be trained or personalized for one or more downstream tasks. One or more adapters 506*a-z* may be attached (e.g., applied), for example, to a selected subset of the parameters of the LLM 502. For instance, in various aspects, parameter efficient fine-tuning (PEFT) may be applied to selected layers of the LLM 502. PEFT involves compressing the increments of the weights, $\Delta W$, instead of the weights.

The selected subset of the parameters of the LLM 502 may be identified based on a determined importance of connections for each downstream task or other selection criteria. In various aspects, the more important connections for fine-tuning on downstream tasks may be identified based on a score function S. The score function S may be given by:

$$S(\Delta W) = L(W) - L(W + \Delta W) \approx -\nabla L(W)\Delta W = \eta \cdot \nabla L(W)\nabla L(W), \quad (1)$$

$$\Delta W = -\eta \cdot \nabla L(W); \quad (2)$$

where L is a loss function, W is the model weight, $\Delta W$ is the weight update, $\nabla$ represents the gradient function, and $\eta$ is the learning rate. In some aspects, the score function S may be approximated using a Taylor expansion. Using the score function S, a score may be determined for each connection (e.g., layer) of the LLM 502. Connections having higher scores may be fine-tuned. On the other hand, connections having lower scores may not be as influential, and thus, may be retained (or fixed). In various aspects, a predefined threshold may be applied score for each connection to determine whether the connection may be retained. In some examples, a sparsity may be determined (e.g., 0%<sparsity<100%), considering memory or storage constraints. The sparsity value may indicate a percentage of a total number of parameters to be fine-tuned. Individual parameter (e.g., connection) scores obtained from the score function S may be sorted and employed along with the predefined sparsity to determine the threshold. For instance, to fine-tune 50% of the total parameters, the threshold may be set using the score of the 50th parameters (among the sorted parameter scores) in ascending order.

In another example, the threshold may be determined using a Kullback-Leibler divergence (KLD) clustering technique. KLD is a statistical measure that quantifies the dissimilarity (e.g., distance) between multiple probability distributions. KLD clustering may be employed to categorize scores into multiple clusters. In turn, the connection scores may be divided into two sets (e.g., one set for applying fine-tuning and the other set for freezing) based on a point at which the scores across clusters exhibit the greatest divergence.

The one or more adapters 506*a-z* may comprise (but are not limited to) low-rank adapters, for example. The one or more adapters 506*a-z* may be attached to the identified connection corresponding to the subset of parameters. Fine-tuning may be performed for the identified subset of parameters using the adapters 506*a-z*. The other parameters may be fixed (e.g., retained). In doing so, a personalized model 508 may be generated. The personalized model 508 may include a set of fine-tuned layers 510*a*, 510*b*, and 510*z* corresponding to the layers of LLM 502 at which the one or more adapters 506*a-z* may be applied. The remaining layers of the personalized model 508 may be maintained as pre-trained.

Figure 6:
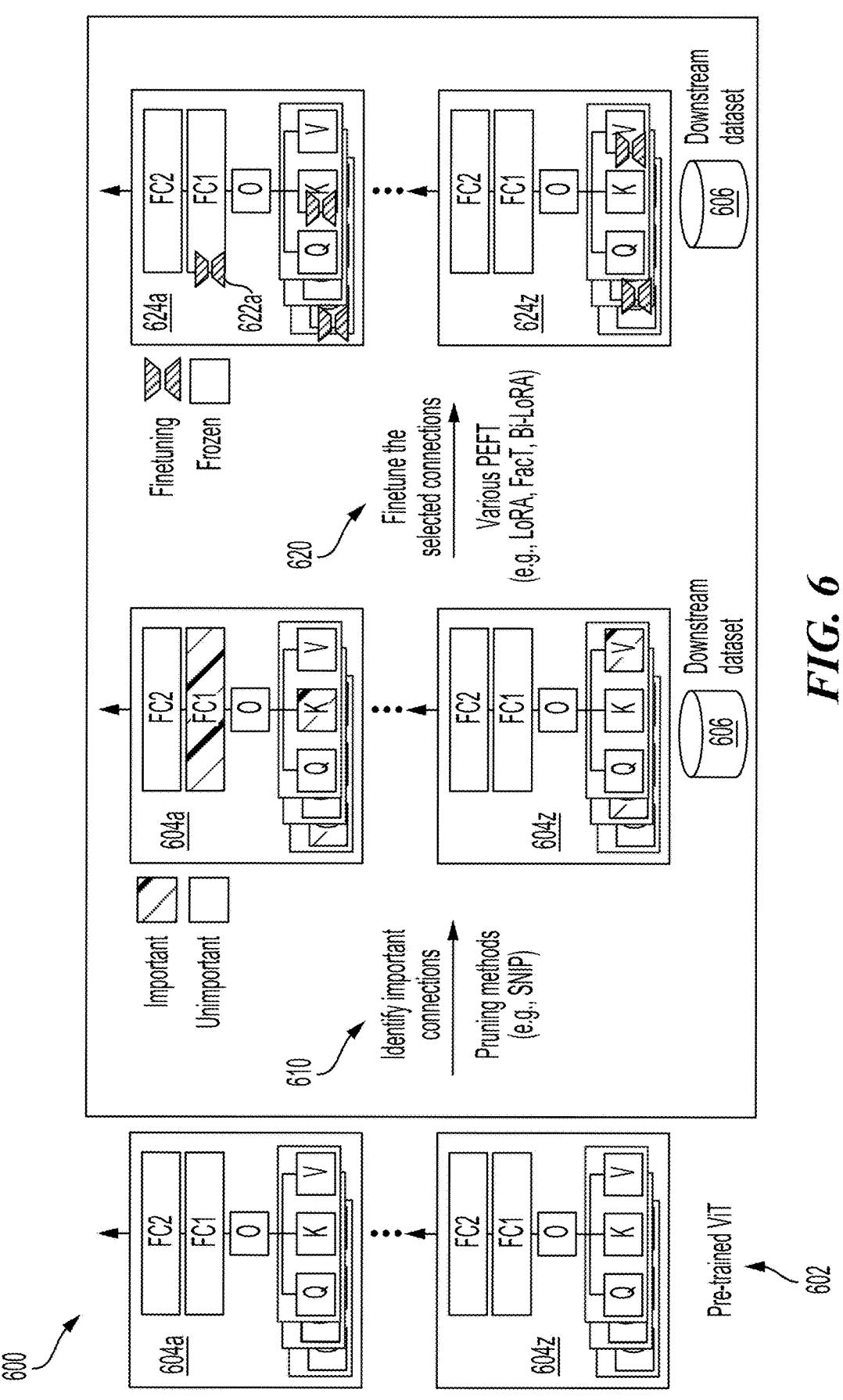
FIG. 6 is a block diagram illustrating an example process for selective parameter efficient fine-tuning (PEFT), in accordance with various aspects of the present disclosure.

FIG. 6 is a block diagram illustrating an example process 600 for selective PEFT, in accordance with various aspects of the present disclosure. Referring to FIG. 6, a pre-trained LLM 602 is provided. The pre-trained LLM 602 may, for example, comprise a vision transformer model, for instance. The pre-trained LLM 602 may include multiple transformer blocks 604*a-z*. Each transformer block (e.g., 604*a*) may include one or more fully connected (FC) layers, an output (O) layer, and an attention layer with query (Q), key (K), and value (V) matrices. The pre-trained LLM 602 may be fine-tuned for a downstream task according to a downstream dataset 606.

At 610, the example process 600 may identify important connections of the pre-trained LLM 602 for the downstream task. A score may be computed for each of the connections as indicated in Equation 2. In the example of FIG. 6, a score may be computed for a weight matrix for each layer (e.g., FC1 or FC2) or each head or dimension (e.g., query (Q) matrix, key (K) matrix, or value (V) matrix). A threshold may be applied to determine whether a connection is important or less influential.

At 620, selected connections 622*a-z* may be fine-tuned. For ease of illustration, only one of the selected connections (622*a*) is labeled. That is, connections with scores greater than the threshold (e.g., 0.75) may be selected for fine-tuning. For instance, an adapter (e.g., 506*a-z* of FIG. 5), such as a low-rank adapter, may be applied to the connections identified as important based on the score. Only the selected connections 622*a-z* (hereinafter referred to as selected connections 622) may be fine-tuned. The remaining connections may remain fixed to form the fine-tuned model 624*a-z*.

Figure 7:
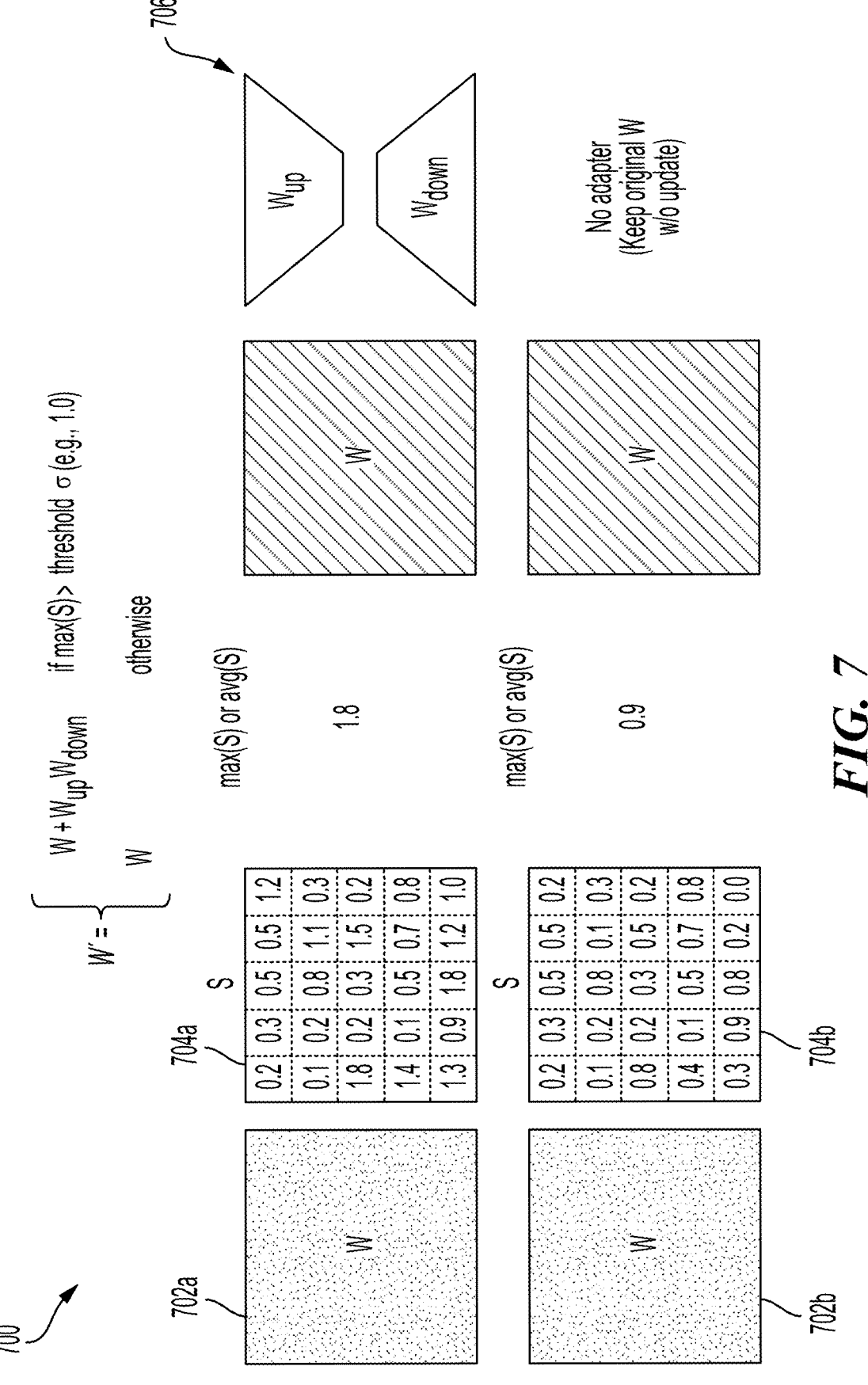
FIG. 7 is a diagram illustrating an example application of a score function for identifying connections for fine-tuning, in accordance with aspects of the present disclosure.

FIG. 7 is a diagram illustrating an example application 700 of a score function for identifying connections for fine-tuning, in accordance with aspects of the present disclosure. Referring to FIG. 7, weight matrices for a layer 702*a* and a layer 702*b* of an LLM (e.g., 502) are shown. A score may be determined for each connection of the layer 702*a* and layer 702*b* according to the score function S specified in Equation 2. Example scores for the connections of layer 702*a* and layer 702*b* may be included in a score matrix 704*a* and a score matrix 704*b*, respectively. A threshold may be applied to determine an importance of the connections. For example, a maximum or average of the value of the score matrices (704*a*, 704*b*) may be applied to determine which layer (e.g., 702*a* or 702*b*) is more important for a certain downstream task.

In the example of FIG. 7, the layer 702*a* has a higher score (e.g., 1.8) than the threshold (e.g., 1.0). As such, the layer 702*a* may be fine-tuned. An adapter 706 (which may function in a manner similar to adapter 506*a-z* of FIG. 5) is attached to update the weights of the layer 702*a*. For pre-trained weights "W", the update may be constrained by representing $\Delta W$ with a low-rank decomposition $W+\Delta W=W+W_{up}W_{down}$, where $W_{up}$ and $W_{down}$ represent the trainable parameters (weigh matrices) with reduced dimensions relative to W (e.g., $W \in \mathbb{R}^{d \times k}$, $W_{up} \in \mathbb{R}^{d \times r}$, $W_{down} \in \mathbb{R}^{r \times k}$, r represents the rank and $r \ll \min(d, k)$).

On the other hand, the weights of the layer 702*b* have score (e.g., 0.9) that is leass than the threshold. As a result, the weights of the layer 702*b* may not be updated and instead may remain fixed.

Figure 8B:
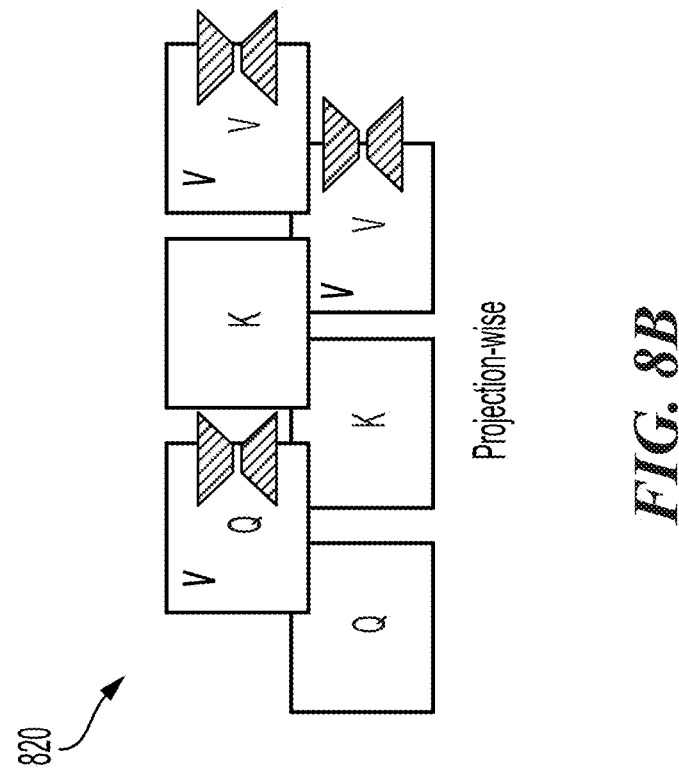
FIGS. 8A-8C are diagrams illustrating example subsets of parameters for fine-tuning, in accordance with aspects of the present disclosure.
Figure 8A:
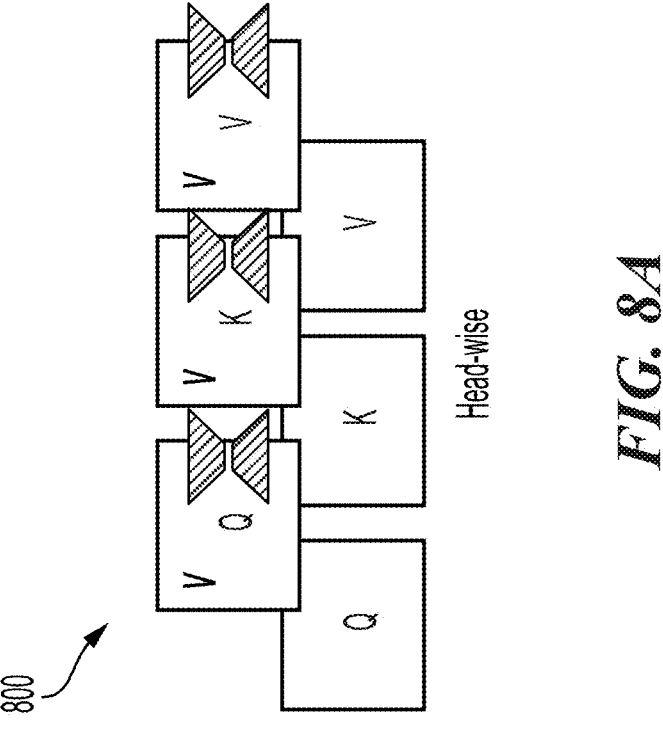
Figure 8C:
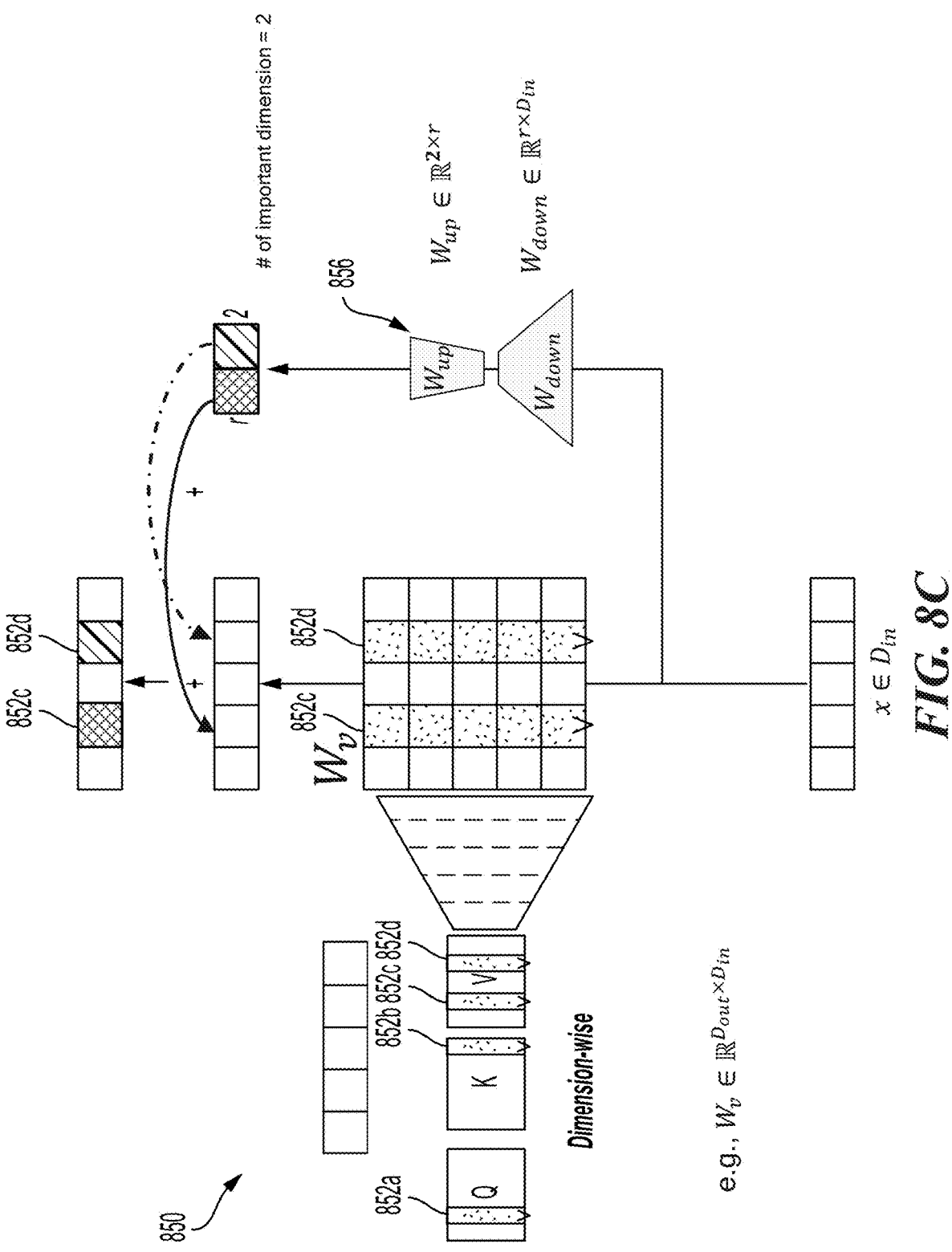

FIGS. 8A-8C are diagrams illustrating example subsets of parameters for fine-tuning, in accordance with aspects of the present disclosure. Referring to FIG. 8A-8C, fine-tuning may be applied to more granular subsets of parameters. For instance, fine-tuning may be selectively applied to a subset of parameters in a head-wise basis 800, as seen in FIG. 8A. For instance, one or more attention heads may be identified as more important for a downstream task based on the score function S specified in Equation 2. In turn, an adapter (e.g., 506*a-z* of FIG. 5) may be applied to the identified attention heads and the weight matrices (e.g., Q matrix, K matrix, V matrix). Only the parameters of the identified heads may be fine-tuned. The parameters of the remaining attention heads (e.g., non-identified attention heads) may remain fixed.

Similarly, fine-tuning may be selectively applied to a subset of parameters on a projection-wise basis 820, as seen in FIG. 8B. For instance, one or more projection matrices may be identified as more important for a downstream task based on the score function S specified in Equation 2. In turn, an adapter (e.g., 506*a-z* of FIG. 5) may be applied to the identified projection matrices. Then, only the parameters of the identified projection matrices may be fine-tuned. The parameters of the remaining (e.g., non-identified) projection matrices may remain fixed.

Further granularity may be beneficially achieved by selectively fine-tuning on a dimension-wise basis 850, as seen in FIG. 8C. For instance, one or more dimensions 852*a-d* within the respective weight matrices of an attention head (e.g., Q matrix, K matrix, V matrix) may be identified as more important for a downstream task based on the score function S specified in Equation 2. For instance, the score for each dimension may be compared to a threshold. A dimension may be identified (e.g., 852*c*, 852*d*) as more important if the score for such dimension is greater than the threshold. In turn, an adapter 856 (which may function in a manner similar to adapter 506*a-z* of FIG. 5) may be applied to the identified dimensions of the weight matrices of the attention heads (e.g., Q matrix, K matrix, V matrix). Only the parameters of the identified dimensions of the weight matrices of the attention heads may be fine-tuned (e.g., 858*c*, 858*d*). The parameters of the remaining dimensions of the weight matrices of the attention heads (e.g., non-identified dimensions) may remain fixed. Thus, in accordance with aspects of the present disclosure, various subsets of the parameters may be selectively fine-tuned using the score function S as specified in Equation 2.

Figure 9:
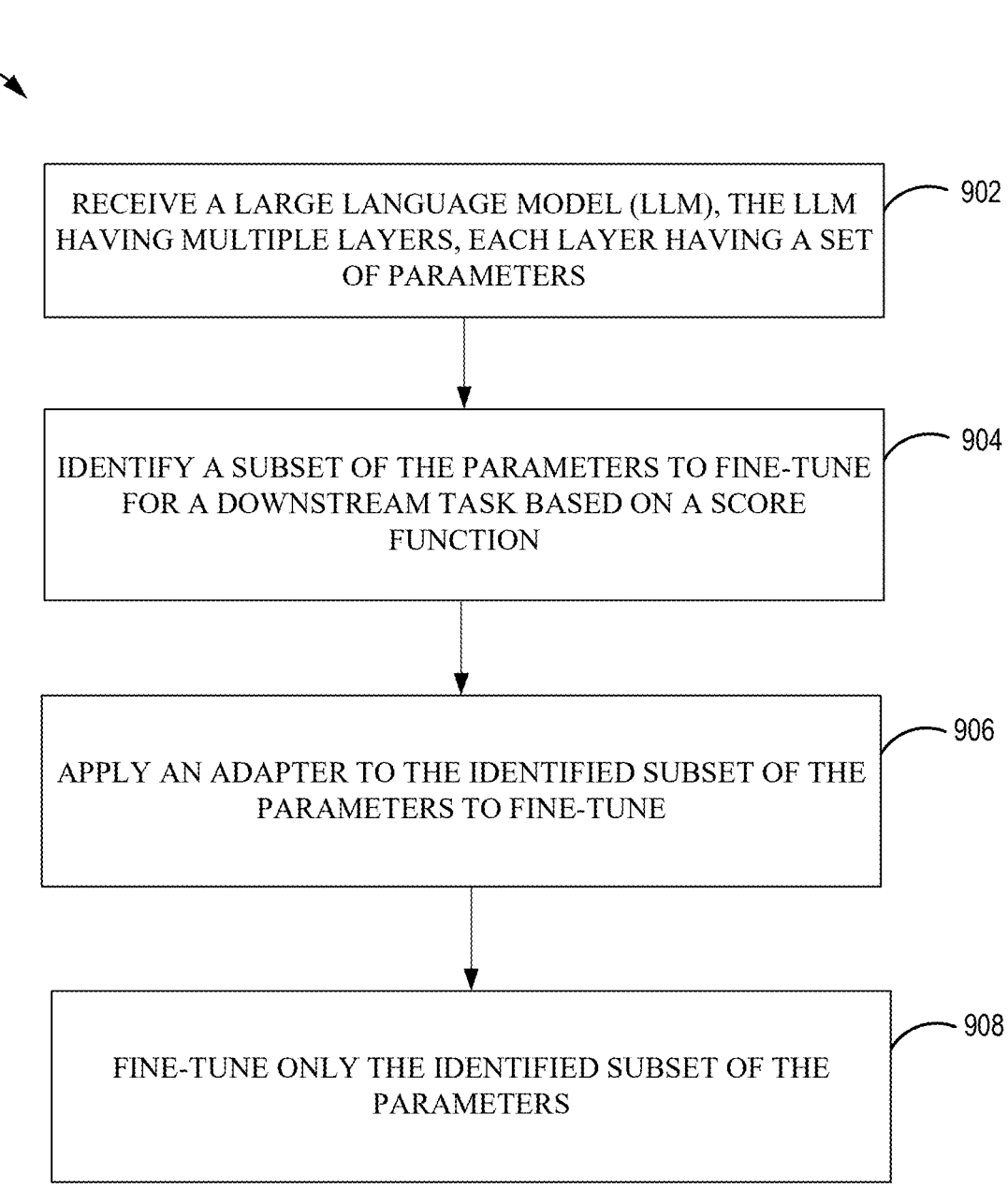
FIG. 9 is a flow diagram illustrating a processor-implemented method of parameter efficient fine-tuning (PEFT), in accordance with various aspects of the present disclosure.

FIG. 9 is a flow diagram illustrating a processor-implemented method 900 of parameter efficient fine-tuning (PEFT), in accordance with various aspects of the present disclosure. The processor-implemented method 900 may be performed by one or more processors such as the CPU (e.g., 102, 422), GPU (e.g., 104, 426), and/or another processing unit (e.g., DSP 424, NPU 428), for example.

At block 902, the one or more processors receive a large language model (LLM), the LLM having multiple layers. Each layer has a set of parameters. For instance, as described with reference to FIG. 5, the LLM 502 may have a set of layers 504*a-z*. Each layer 504*a-z* of the LLM 502 may include a set of pre-trained parameters $W_0$. In various aspects, the LLM 502 may be configured for a visual reasoning task, a generative artificial intelligence task, an image processing task, or other tasks, for example.

At block 904, the one or more processors identify a subset of the parameters to fine-tune for a downstream task based on a score function. As described, for example with reference to FIG. 5, a subset of the parameters of the LLM 502 may be identified for fine-tuning based on a determined importance of connections for each downstream task or other selection criteria. In various aspects, the more important connections for fine-tuning on downstream tasks may be identified based on a score function S.

At block 906, the one or more processors apply an adapter to the identified subset of the parameters to fine-tune. As described, with reference to FIG. 5, one or more adapters 506*a-z* may be attached (e.g., applied), for example, to the identified subset of the parameters of the LLM 502.

At block 908, the one or more processors fine-tune only the identified subset of the parameters. For example, as described with reference to FIG. 5, the one or more adapters 506*a-z* may be attached to the identified connection corresponding to the subset of parameters. Fine-tuning may be performed for the identified subset of parameters using the adapters 506*a-z*. The other parameters may be fixed (e.g., retained).

Implementation examples are provided in the following numbered clauses.

1. An apparatus comprising:
   at least one memory; and at least one processor coupled to the at least one memory, the at least one processor configured to:

receive a large language model (LLM), the LLM having multiple layers, each layer having a set of parameters;

identify a subset of the parameters to fine-tune for a downstream task based on a score function;

apply an adapter to the identified subset of the parameters to fine-tune; and fine-tune only the identified subset of the parameters.

2. The apparatus of clause 1, in which remaining parameters of the LLM remain fixed.

3. The apparatus of clause 1 or 2, in which the at least one processor is further configured to perform an inference task using a fine-tuned model including the fine-tuned subset of the parameters and the fixed remaining parameters.

4. The apparatus of any of clauses 1-3, in which the score function is computed based on a weight gradient.

5. The apparatus of any of clauses 1-4, in which the at least one processor is further configured to:

compute a score for each parameter of the set of parameters;

compare the score for each parameter to a threshold value; and select the subset of the parameters that exceed the threshold for fine-tuning.

6. The apparatus of any of clauses 1-5, in which the subset of the parameters is selected on a layer-basis, a head-basis, or a dimension-basis.

7. The apparatus of any of clauses 1-6, in which the LLM comprises a vision transformer or a generative artificial intelligence model.

8. A processor-implemented method performed by one or more processors, the processor-implemented method comprising:

receiving a large language model (LLM), the LLM having multiple layers, each layer having a set of parameters;

identifying a subset of the parameters to fine-tune for a downstream task based on a score function;

applying an adapter to the identified subset of the parameters to fine-tune; and fine-tuning only the identified subset of the parameters.

9. The processor-implemented method of clause 8, in which remaining parameters of the LLM remain fixed.

10. The processor-implemented method of clause 8 or 9, further comprising performing an inference task using a fine-tuned model including the fine-tuned subset of the parameters and the fixed remaining parameters.

11. The processor-implemented method of any of clauses 8-10, in which the score function is computed based on a weight gradient.

12. The processor-implemented method of any of clauses 8-11, further comprising:

computing a score for each parameter of the set of parameters;

comparing the score for each parameter to a threshold value; and selecting the subset of the parameters that exceed the threshold for fine-tuning.

13. The processor-implemented method of any of clauses 8-12, in which the subset of the parameters is selected on a layer-basis, a head-basis, or a dimension-basis.

14. The processor-implemented method of any of clauses 8-13, in which the LLM comprises a vision transformer or a generative artificial intelligence model.

15. An apparatus, comprising:

means for receiving a large language model (LLM), the LLM having multiple layers, each layer having a set of parameters;

means for identifying a subset of the parameters to fine-tune for a downstream task based on a score function;

means for applying an adapter to the identified subset of the parameters to fine-tune; and means for fine-tuning only the identified subset of the parameters.

16. The apparatus of clause 15, in which remaining parameters of the LLM remain fixed.

17. The apparatus of clause 15 or 16, further comprising performing an inference task using a fine-tuned model including the fine-tuned subset of the parameters and the fixed remaining parameters.

18. The apparatus of any of clauses 15-17, in which the score function is computed based on a weight gradient.

19. The apparatus of clauses 15-18, further comprising:

means for computing a score for each parameter of the set of parameters;

means for comparing the score for each parameter to a threshold value; and means for selecting the subset of the parameters that exceed the threshold for fine-tuning.

20. The apparatus of clauses 15-19, in which the subset of the parameters is selected on a layer-basis, a head-basis, or a dimension-basis.

In one aspect, the receiving means, identifying means, applying means and/or fine-tuning means may be the CPU (e.g., 102, 422), GPU (e.g., 104, 426), another processing unit (e.g., DSP 424, NPU 428), and/or the dedicated memory block 118, configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An apparatus comprising:
    at least one memory; and
    at least one processor coupled to the at least one memory, the at least one processor configured to:

receive a large language model (LLM), the LLM having multiple layers, each layer having a set of parameters;
    select a subset of the parameters to fine-tune for a downstream task based on a score function, the score function computed for each connection between layers based on a weight update, a loss function, a model weight and a learning rate, such that connections with scores lower than a first threshold are retained with fixed parameters and connections with scores above the first threshold are fine-tuned;
    apply an adapter to the subset of the parameters to fine-tune; and
    fine-tune, using the adapter, only the subset of the parameters.

2. The apparatus of claim 1, in which the at least one processor is further configured to perform an inference task using a fine-tuned model including the fine-tuned subset of the parameters and the fixed remaining parameters.

3. The apparatus of claim 1, in which the at least one processor is further configured to:
    compute a score for each parameter of the set of parameters;
    compare the score for each parameter to a second threshold value; and
    select the subset of the parameters that exceed the second threshold value for fine-tuning.

4. The apparatus of claim 1, in which the subset of the parameters is selected on a layer-basis, a head-basis, or a dimension-basis.

5. The apparatus of claim 1, in which the LLM comprises a vision transformer or a generative artificial intelligence model.

6. A processor-implemented method performed by one or more processors, the processor-implemented method comprising:
    receiving a large language model (LLM), the LLM having multiple layers, each layer having a set of parameters;
    selecting a subset of the parameters to fine-tune for a downstream task based on a score function, the score function computed for each connection between layers based on a weight update, a loss function, a model weight and a learning rate, such that connections with scores lower than a first threshold are retained with fixed parameters and connections with scores above the first threshold are fine-tuned;
    applying an adapter to the subset of the parameters to fine-tune; and
    fine-tuning, using the adapter, only the subset of the parameters.

7. The processor-implemented method of claim 6, further comprising performing an inference task using a fine-tuned model including the fine-tuned subset of the parameters and the fixed remaining parameters.

8. The processor-implemented method of claim 6, further comprising:
    computing a score for each parameter of the set of parameters;
    comparing the score for each parameter to a second threshold value; and
    selecting the subset of the parameters that exceed the second threshold value for fine-tuning.

9. The processor-implemented method of claim 6, in which the subset of the parameters is selected on a layer-basis, a head-basis, or a dimension-basis.

10. The processor-implemented method of claim 6, in which the LLM comprises a vision transformer or a generative artificial intelligence model.

11. An apparatus, comprising:

means for receiving a large language model (LLM), the LLM having multiple layers, each layer having a set of parameters;

means for selecting a subset of the parameters to fine-tune for a downstream task based on a score function, the score function computed for each connection between layers based on a weight update, a loss function, a model weight and a learning rate, such that connections with scores lower than a first threshold are retained with fixed parameters and connections with scores above the first threshold are fine-tuned;

means for applying an adapter to the subset of the parameters to fine-tune; and means for fine-tuning, using the adapter, only the subset of the parameters.

12. The apparatus of claim 11, further comprising performing an inference task using a fine-tuned model including the fine-tuned subset of the parameters and the fixed remaining parameters.

13. The apparatus of claim 11, further comprising:

means for computing a score for each parameter of the set of parameters;

means for comparing the score for each parameter to a second threshold value; and means for selecting the subset of the parameters that exceed the second threshold value for fine-tuning.

14. The apparatus of claim 11, in which the subset of the parameters is selected on a layer-basis, a head-basis, or a dimension-basis.

* * * * *